United States Patent
Arai et al.

[11] Patent Number: 5,814,251
[45] Date of Patent: Sep. 29, 1998

[54] MOLDING METHOD OF INJECTION MOLDING MACHINE

[75] Inventors: Tsuyoshi Arai; Nobuyuki Nakamura; Makoto Nakazawa; Toshiyasu Koda, all of Nagano, Japan

[73] Assignee: Nissei Plastic Industrial Co., Ltd., Nagano-ken, Japan

[21] Appl. No.: 551,268

[22] Filed: Mar. 21, 1995

[30] Foreign Application Priority Data

Mar. 22, 1994 [JP] Japan .................................. 6-076714

[51] Int. Cl.⁶ .................................................. B29C 45/76
[52] U.S. Cl. .................... 264/40.1; 264/40.5; 264/328.7; 425/145; 425/150
[58] Field of Search ................................ 264/40.1, 40.5, 264/40.7, 2.2, 328.7, 328.11; 425/145, 146, 147, 149, 150, 166, 576, 586

[56] References Cited

U.S. PATENT DOCUMENTS

| | | | |
|---|---|---|---|
| 4,889,478 | 12/1989 | Sato | 425/150 |
| 5,002,706 | 3/1991 | Yamashita | 264/40.5 |
| 5,176,859 | 1/1993 | Leffew | 425/150 |
| 5,470,513 | 11/1995 | Nogawa et al. | 264/40.1 |
| 5,552,094 | 9/1996 | Kubota | 425/150 |
| 5,554,326 | 9/1996 | Nakazawa et al. | 264/40.1 |

FOREIGN PATENT DOCUMENTS

| | | |
|---|---|---|
| 63-13726 | 1/1988 | Japan . |
| 3-39816 | 6/1991 | Japan . |

*Primary Examiner*—Jill L. Heitbrink
*Attorney, Agent, or Firm*—Birch, Stewart, Kolasch & Birch, LLP

[57] ABSTRACT

A method of operation for an injection molding machine is disclosed. The injection molding machine includes an injector having an advancable screw and a barrel cylinder, and a mold clamp for holding a mold with a controllable pressure and for allowing the mold to open a controllable amount. In performing the method, preset values are established for a stop position of the advancable screw, a clamping pressure of the mold clamp, and an opening amount for the mold. The screw is advanced up to the preset stop position and stopped thereat. The screw is controlled so as to ensure the location of the screw at the preset stop position for a preset time. Resin is injected from the barrel cylinder into the mold. The mold is clamped with the preset clamping pressure, during the preset time, by operating the mold clamp while maintaining the positioning of the screw at the preset stop position. Further, the mold clamp is operated to controllably allow for opening of the mold during the injecting step, so that the mold is allowed to open to the preset opening amount when the injecting step is completed.

8 Claims, 3 Drawing Sheets

MOLDING METHOD OF INJECTION MOLDING MACHINE

BACKGROUND OF THE INVENTION

1. Field of the Invention

The present invention relates to a molding method of an injection molding machine preferable to for use in molding a relatively thin molding article such as a compact disk.

2. Description of the Relevant Art

According to an existing molding method of an injection molding machine, as disclosed in the official gazette of Japanese Patent Publication No. 3(1991)-39816, at the time of injection and filling, a screw was advanced by speed control to inject and fill the resin in a barrel cylinder into a mold, and thereafter, a predetermined holding pressure was applied to the resin in the mold by pressure controlling the screw. In this case, if the screw is advanced through the speed control, the load pressure of the screw slowly rises because the resin is filled in the mold. When the screw had reached to a speed-pressure changing point, the screw control was changed from the speed control to the pressure control and predetermined holding pressures, for example, a first holding force and a second holding force were applied successively to the resin in the mold for a predetermined set time respectively.

Meanwhile, in the case where a relatively thin molding article, such as a compact disk, or laser disk is molded, an injection and compression molding method has been also used. The method was made such that, because resin hardly enters the entire mold cavity, besides a predetermined mold opening amount is set to a mold, a mold clamping pressure is set to a low pressure, the mold is opened by the set mold opening amount at the time of filling the resin to accelerate the irruption (flow) of the resin into the mold and the exhaust of gas from the mold, and the mold is clamped again by a high re-clamping pressure during or after the filling so as to compress the resin in the mold (for example, refer to the official gazette of Japanese Patent Application Laid-Open No. 63(1988)-13726.

In the case of these existing methods, however, a molding failure easily occurs due to the weight fluctuation of molding articles because the amount of resin to be injected into a mold cavity also fluctuates when the pressure applied to the resin fluctuates due to the disturbances of the flowing state, temperature or the like of the resin. Particularly, the case of the compression molding method had a problem that the weight fluctuation of molding articles easily occurs because the mold opening amount easily becomes unstable.

SUMMARY OF THE INVENTION

It is an object of the present invention to provide a molding method of an injection molding machine capable to constantly fill a normal amount of resin into a mold cavity, to uniformalize the weight of molding articles, and further to prevent a molding failure, even if the pressure applied to the resin fluctuates due to the disturbances of the flowing state, temperature or the like of the resin.

To achieve the above object, the present invention is characterized in that: previously setting an advance finish and stop position Xs of a screw 2 based on the amount of resin necessary for injection and filling, a predetermined mold clamping pressure Pc for a mold 4, and a mold opening amount So of the mold 4 based on the filling of the resin; at the time of injection and filling, advancing the screw 2 up to the advance finish and stop position Xs and stopping the screw 2 at the advance finish and stop position Xs for a predetermined time "ts" by position control, and applying a holding pressure based on the mold clamping pressure Pc to the mold 4 opened by mold opening amount So in order to perform molding by advancing the screw 2 by speed control to inject and fill the resin in a barrel cylinder 3 into the mold 4 and applying the predetermined holding pressure to the resin in the mold 4 by pressure control after filling.

In this case, it is preferable to start the braking of the screw 2 at a position Xf before the screw 2 reaches the advance finish and stop position Xs. Moreover, it is preferable to perform the position control of the screw 2 by controlling an injection cylinder 5 having a double-rod piston 6 by a servo valve 7. On the other hand, it is possible to re-clamp the mold 4 by stopping the screw 2 after advancing the screw 2 up to the advance finish and stop position Xs then retreating it up to a position being nearer than the advance finish and stop position Xs, and applying a mold re-clamping pressure higher than said mold clamping pressure Pc to the mold 4. Furthermore, it is possible to stop the screw 2 at the advance finish and stop position xs for a predetermined time "ta" and thereafter apply predetermined holding pressures, for example, holding pressures Pm and Pn to the mold 4 by the screw 2.

Thereby, when the screw 2 moves through the injection stroke from an injection start position to the advance finish and stop position Xs, the normal amount of resin is injected and filled into the mold 4. If the resin pressure becomes larger than the mold clamping pressure Pc when the resin is filled into the mold 4 in accordance with the setting of the mold clamping pressure Pc and the mold opening amount So to the mold 4, the mold 4 would be opened by the mold opening amount So.

Therefore, if the screw 2 is advanced from the injection start position by speed control, the resin in the barrel cylinder 3 would be injected into the mold 4. Thus, a normal resin amount for producing conforming products is filled into the mold 4 by starting the braking of the screw 2 after advancing the screw 2 up to the position Xf along the line of reaching it to the advance finish and stop position Xs and stopping it at the advance finish and stop position Xs, by stopping the screw 2 at the advance finish and stop position Xs for the predetermined time "ts" by position control. Therefore, by repeating the above controlling every molding cycle, molding articles based on the normal resin amount which always being constant are obtained and any molding failure is eliminated. The position control of the screw 2 is securely and accurately performed by controlling the injection cylinder 5 having the double-rod piston 6 by the servo valve 7.

On the other hand, because the relatively low mold clamping pressure Pc is applied to the mold 4, when resin is filled into the mold 4 and the pressure of the resin in the mold 4 becomes larger than the mold clamping pressure Pc, the cavity of the mold 4 expands and the flowing of the resin and discharge of gas are accelerated since the mold 4 is opened by the mold opening amount So. Moreover, even under the above state, because the mold clamping pressure Pc is applied to the mold 4, a predetermined holding pressure based on the mold claming pressure Pc is applied to the resin in the mold 4 during the predetermined time "ts" in which the screw 2 stops at the advance finish and stop position Xs.

Incidentally, also in the case where the mold 4 is re-clamped by stopping the screw 2 after advancing it up to the advance finish and stop position Xs then retreating it up to a position nearer than the advance finish and stop position Xs and by applying a mold re-clamping pressure higher than the mold clamping pressure Pc, beside the normal amount of resin is obtained at this point of time because the screw 2 is once stopped at the advance finish and stop position Xs, a proper amount of returning resin in re-clamping can be allowed by retreating the screw 2 up to a position nearer than the advance finish and stop position Xs. Moreover, also in the case where after stopping the screw 2 at the advance finish and stop position Xs for the predetermined time "ta", the predetermined holding pressures Pm . . . is applied by the screw 2, the normal amount of resin is obtained at this point of time because the screw 2 is once stopped at the advance finish and stop position Xs.

DETAILED DESCRIPTION OF THE PREFERRED EMBODIMENTS

Preferred embodiments of the present invention are described below in detail by referring to the accompanying drawings.

First, the constitution of an injection molding machine for executing the molding method of the present invention is described below by referring to FIG. 2.

Figure 2:
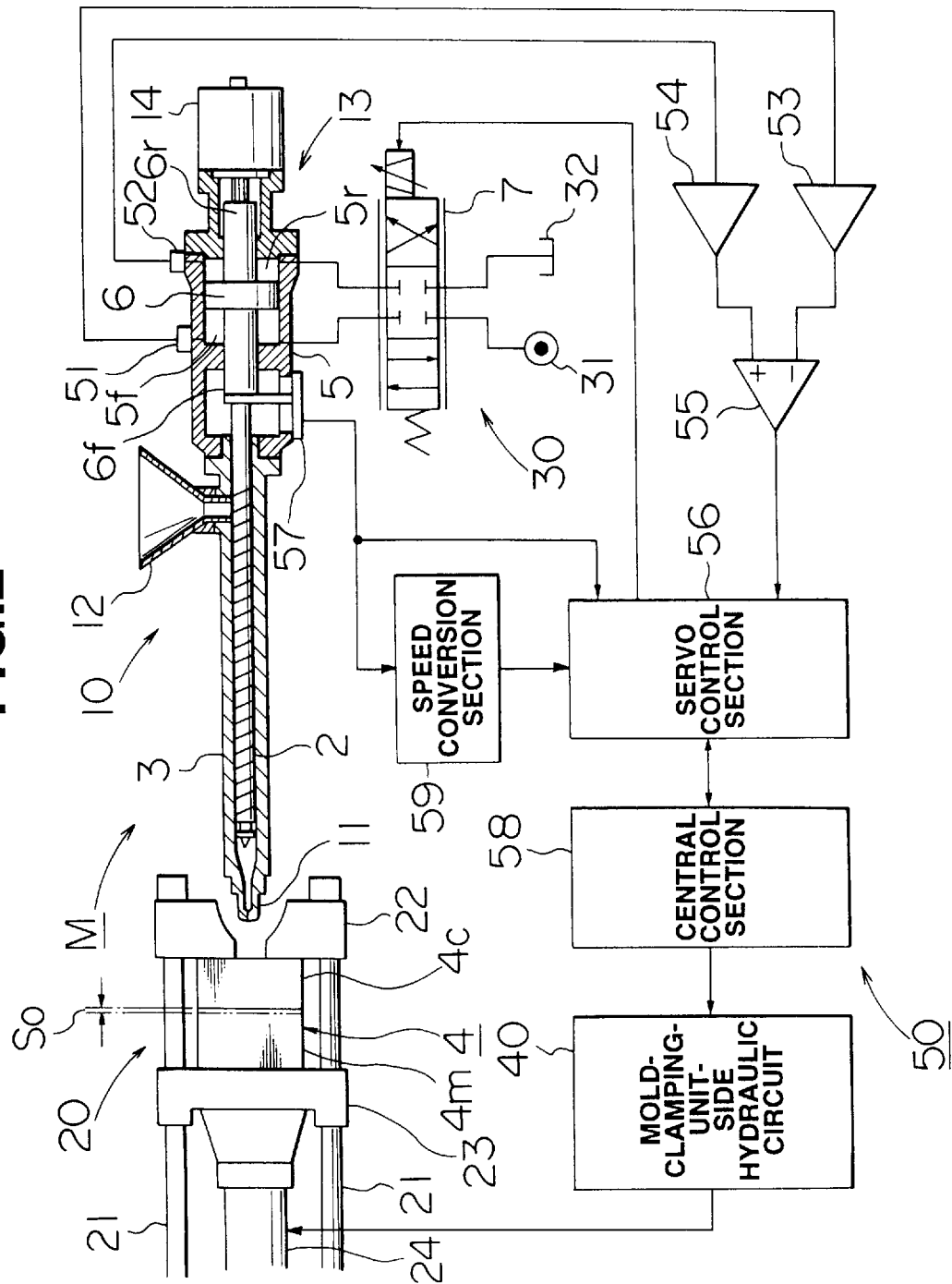
FIG. 2 is a block diagram of an injection molding machine for executing a molding method of the present invention.

In FIG. 2, an injection molding machine shown by symbol M is provided with an injection unit 10 and a mold clamping unit 20. The injection unit 10 is provided with a barrel. cylinder 3 having an injection nozzle 11 at its front end and a hopper 12 at its rear end. A screw 2 is inserted into the barrel cylinder 3 and a screw driving section 13 is connected to the rear end of the barrel cylinder 3. The screw driving section 13 is provided with an injection cylinder 5 built-in a double-rod piston 6. A front rod 6f protruded forward from the piston 6 is connected to the rear end of the screw 2 and the shaft of an oil motor 14 set to the injection cylinder 5 is spline-connected with a rear rod 6r protruded backward from the piston 6.

The mold clamping unit 20 is provided with a plurality of tie bars 21, which support a fixed mold 4c by a fixed plate 22 set to the front end of the tie bars 21. A movable mold 4m is connected to a movable plate 23 which is slidably provided to the tie bars 21. Thus, the movable plate 23 can be moved by a mold clamping cylinder 24. In this case, the fixed mold 4c and the movable mold 4m constitute a mold 4 and a predetermined mold opening amount So is set to the mold 4. Therefore, the mold 4 can be opened by the mold opening amount So from the fully closed state.

Moreover, an injection-unit-side hydraulic circuit 30 is connected to the injection cylinder 5 and a mold-clamping-unit-side hydraulic circuit 40 is connected to the mold clamping cylinder 24. The hydraulic circuit 30 is provided with a four-port servo valve 7. The port B of the servo valve 7 is connected to a rear oil chamber 5r of the injection cylinder 5, the port P of it is connected to an hydraulic source (hydraulic pump and accumulator) 31, and the port T of it is connected to an oil tank 32.

Moreover, a controller 50 is connected to the hydraulic circuits 30 and 40. First, a pressure sensor 51 using a strain gauge for detecting the oil pressure of the front oil chamber 5f and the same-type pressure sensor 52 for detecting the oil pressure of the rear oil chamber 5r are set to the injection cylinder 5. Then, the pressure sensors 51 and 52 are connected to the input section of a deviation detector 55 through head amplifiers 53 and 54 respectively. Thereby, the deviation between the oil pressure of the front oil chamber 5f and that of the rear oil chamber 5r can be obtained at the output section of the deviation detector 55. Thus, the deviation includes detected-pressure information showing the pressure of the screw 2 and it is sent to a servo control section 56. Reference numeral 57 represents a position detector for detecting the position of the screw 2. The positional information detected by the detector 57 is sent to a central control section 58 through the servo control section 56 as well as converted to detected-speed information through a speed conversion section 59. The detected-speed information is sent to the servo control section 56. Moreover, the output of the servo control section 56 is sent to the servo valve 7. The servo control section 56 and the mold clamping-unit-side hydraulic circuit 40 are connected to the central control section 58.

Thus, at the time of speed control, the servo control section 56 compares the detected-speed information obtained from the speed conversion section 59 with the set-speed information sent from the central control section 58 control and sends the speed information, according to the deviation between the detected-speed information and the set-speed information to the servo valve 7, to feedback-control the advance speed of the screw 2. Moreover, at the time of pressure control, the section 56 compares the detected-pressure information obtained from the deviation detector 55 with the set-pressure information (e.g. holding pressures Pm, Pn and the like) sent from the central control section 58 and sends the pressure control information, according to the deviation between the detected-pressure information and the set-pressure information to the servo valve 7, to feedback-control the pressure of the screw 2. Furthermore, at the time of position control, the section 56 compares the detected-position information obtained from the position detector 57 with the set-position information (e.g. advance finish and stop position xs, the position Xf nearer than the position of the advance finish and stop position Xs and the like) sent from the central control section 58 and sends the position control information, according to the deviation between the detected-position information and the set-position information to the servo valve 7, to feedback-control the position of the screw 2. Furthermore, the controller 50 sends the set-pressure information (e.g. mold clamping pressure Pc and the like) from the central control section 58 to the mold-clamping-unit-side hydraulic circuit 40 and drives the mold clamping cylinder 24 to open-loop-control the mold clamping pressure.

Figure 1:
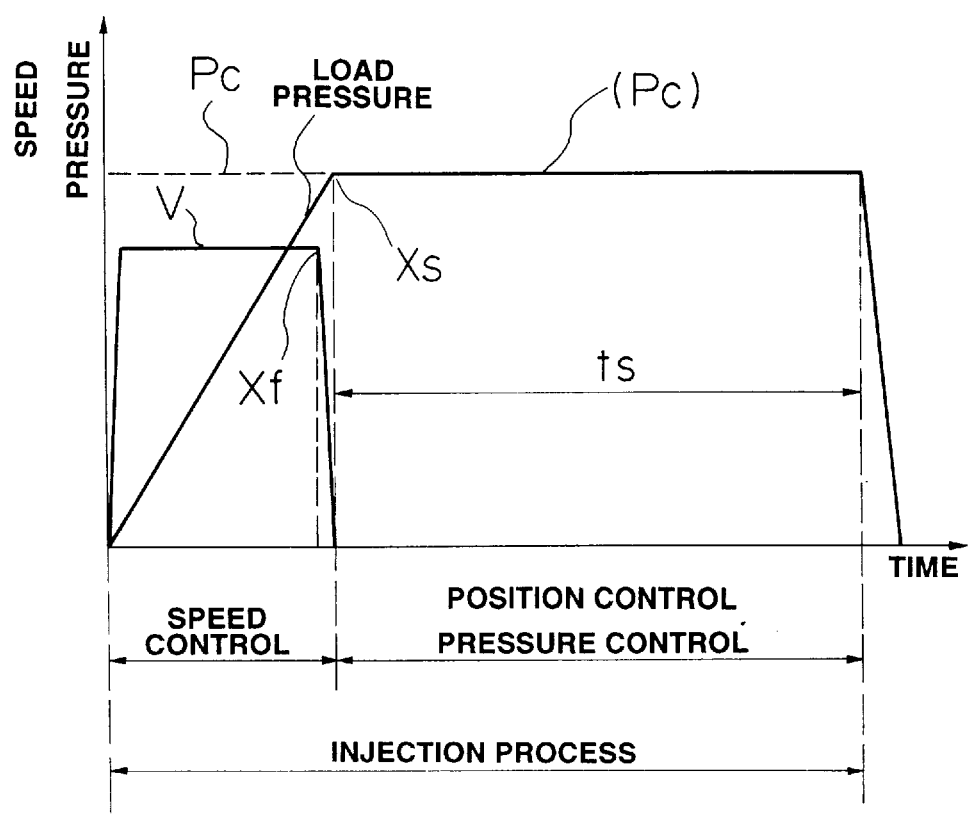
FIG. 1 is a characteristic diagram of speed and pressure of an injection process in the case of molding according to a molding method of the present invention.

The molding method of the present invention using the injection molding machine M, is described below by referring to FIGS. 1 and 2.

First, the command values concerning the advance finish and stop position Xs, position Xf nearer than the advance finish position Xs, mold clamping pressure Pc, holding pressures Pm, Pn and the like are sent to the central control section 58 as the set information. In this case, the advance finish position Xs is a position to where the screw 2 advances, at the time of injection and filling, and stops when the filling is finished. Thereby, when the screw 2 moves through the injection stroke from the injection start position to the advance finish and stop position Xs, the normal amount of resin is injected into the mold 4. The position Xf is nearer than the advance finish and stop position Xs and is a position where braking of the screw 2 begins, which braking is necessary to stop the screw 2 at the advance finish and stop position Xs. Therefore, it is necessary to set the position Xf by considering the inertia of the screw 2, so that the screw 2 stops in the minimum stance. Moreover, it is necessary to set the mold clamping pressure Pc lower (approx. 60%) than the original mold clamping pressure so that the mold 4 opens by the mold opening amount So when it is filled with resin.

In the injection process, the screw 2 is advanced from the injection start position by speed control at a speed of V. Thereby, the measured resin in the barrel cylinder 3 is injected and filled into the cavity of the mold 4. When the screw 2 advances up to the position Xf, the braking of the screw 2 is started to make the screw 2 stop at the advance finish and stop position Xs. Because the screw 2 is braked by controlling the injection cylinder 5 having the double-rod piston 6 by the servo valve 7, the screw 2 is stopped quickly, stably, and securely. Moreover, the normal amount of resin is filled into the mold 4 to obtain a good product. The speed control pattern shown in FIG. 1 is an example of speed control in the first speed range. However, it is possible to control the speed by various speed ranges (e.g. second and third speed ranges) successively. Therefore, by repeating the above control every molding cycle, molded articles can be obtained which have a constant amount of resin and any molding failure is eliminated.

The screw 2 is stopped at the advance finish and stop position Xs for the predetermined time "ts" by position control. The positioning of the screw 2 is securely and accurately performed because the injection cylinder 5, having the double-rod piston 6, is controlled by the servo valve 7.

Because the relatively-low mold clamping pressure Pc is applied to the mold 4, the resin is filled into the mold 4. When the pressure of the resin in the mold 4 becomes larger than the mold clamping pressure Pc, the mold 4 is opened by the mold opening amount So. Thereby, the cavity of the mold 4 expands and the flowing of the resin and the discharge of gas are accelerated. Moreover, while the screw 2 stops at the advance finish and stop position Xs, a predetermined holding pressure according to the mold clamping pressure Pc is applied to the resin in the mold 4.

Therefore, in the molding method according to the present invention, the normal amount of resin is always filled into the mold cavity even if the pressure applied to the resin is fluctuated due to the disturbances of the flowing state, temperature and the like of the resin, and any molding failure is eliminated by uniformizing the weight of molding articles. Moreover, even if the mold clamping pressure is not accurately controlled by using open-loop control, always the normal amount of resin is stably filled into the mold 4.

It is also possible to re-clamp the mold 4 by stopping the screw 2 after advancing it up to the advance finish and stop position Xs then retreating it up to a position nearer than the advance finish and stop position Xs, and by applying a re-clamping pressure (100%) higher than the mold clamping pressure Pc (approx. 60%) to the mold 4. Also in this case, because the screw 2 is once stopped at the advance finish and stop position Xs, the normal amount of resin can be obtained at this point of time and a proper amount of return resin in re-clamping can be allowed by retreating the screw 2 up to a position nearer than the advance finish and stop position Xs.

Next, the molding method of the injection molding machine according to the modified embodiment of the present invention is described below by referring to FIG. 3.

Figure 3:
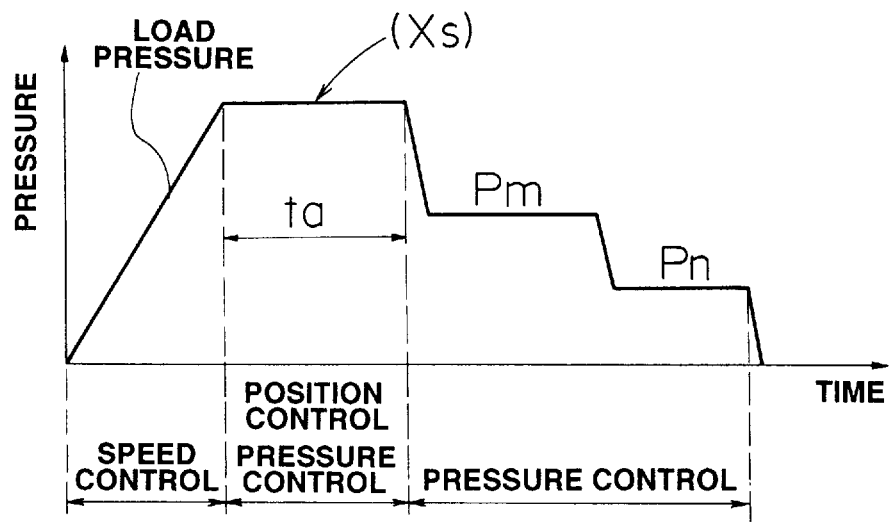
FIG. 3 is a characteristic diagram of speed and pressure of an injection process in the case of molding according to a molding method of a modified embodiment of the present invention.

FIG. 3 shows the case where the screw 2 is stopped at the advance finish and stop position Xs for the predetermined time "ta" and thereafter predetermined holding pressures Pm and Pn are applied by the screw 2. In this case, because the holding pressures Pm and Pn can be detected by the pressure of the screw 2, that is, by the pressure sensors 51 and 52 set to the injection cylinder 5, the pressures Pm and Pn can be controlled by the control system in the injection unit 10. Also in this case, because the screw 2 is once stopped at the advance finish and stop position Xs, the normal amount of resin is obtained at this point of time.

Figure 4:
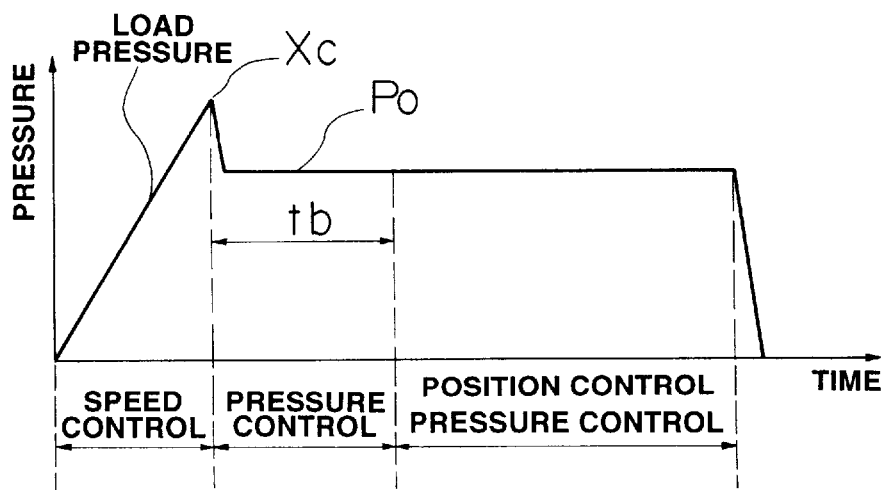
FIG. 4 is a characteristic diagram of pressure in the case of molding according to a molding method of an applied embodiment of the present invention.

FIG. 4 shows an applied embodiment. In the case of this embodiment, a predetermined holding pressure Po is applied to the resin in the mold 4 for a predetermined time "tb" when the screw 2 reaches a speed-pressure change point Xc and thereafter the control is switched to the position control so that the position of the screw 2 is fixed.

The embodiments of the present invention are described above in detail. However, the present invention is not restricted to the embodiments. The detailed constitution, technique and the like of the present invention can be optionally modified as long as they are not deviated from the gist of the present invention.

We claim:
1. A method of operation for an injection molding machine, the injection molding machine including an injector having an advancable screw and a barrel cylinder, and a mold clamp for holding a mold with a controllable pressure and for allowing the mold to open a controllable amount, the method comprising the steps of:

establishing preset values for a preset stop position of the advancable screw, a preset clamping pressure of the mold clamp, and a preset opening amount for the mold based upon an amount of resin necessary to form a desired molded object;

advancing the screw up to the preset stop position;

injecting the resin in the barrel cylinder into the mold;

stopping the screw at the preset stop position;

controlling the screw so as to ensure positioning of the screw at the preset stop position for a preset time;

clamping the mold with the preset clamping pressure, during the preset time, by operating the mold clamp while maintaining the positioning of the screw at the preset stop position; and operating the mold clamp to controllably allow for opening of the mold during the injecting step, so that the mold is allowed to open to the preset opening amount as the injecting step is completed;

wherein the step of advancing the screw includes controlling the speed of the advancing screw and braking the speed of the advancing screw at a predetermined braking position before the preset stop position.

2. The method of claim 1, further including the steps of:

retracting the screw to a retracted position after the injecting step is completed; and clamping the mold with a further clamping pressure greater than the preset clamping pressure.

3. The method of claim 1, further including the step of:

applying a holding pressure to the resin in the mold using the screw, after the elapse of the preset time.

4. The method of claim 1, wherein the step of controlling the screw is accomplished by using a double-rod piston and a servo valve.

5. The method of claim 2, further including the step of:

applying a holding pressure to the resin in the mold using the screw, after the elapse of the preset time.

6. The method of claim 2, wherein the step of controlling the screw is accomplished by using a double-rod piston and a servo valve.

7. The method of claim 3, wherein the step of controlling the screw is accomplished by using a double-rod piston and a servo valve.

8. The method of claim 5, wherein the step of controlling the screw is accomplished by using a double-rod piston and a servo valve.

* * * * *